United States Patent [19]

Smith

[11] Patent Number: 4,589,632
[45] Date of Patent: May 20, 1986

[54] JACK LOCKING MECHANISM

[76] Inventor: Larry D. Smith, 9902 Wentworth Dr., Westminster, Calif. 92683

[21] Appl. No.: 560,076

[22] Filed: Dec. 9, 1983

[51] Int. Cl.⁴ .............................................. B60P 9/02
[52] U.S. Cl. .................... 254/418; 280/765.1
[58] Field of Search .......... 280/764.1, 765.1; 74/28, 813 L; 269/208; 254/418–427

[56] References Cited

U.S. PATENT DOCUMENTS

| | | | |
|---|---|---|---|
| 1,393,497 | 10/1921 | Cadman. | |
| 2,016,468 | 10/1935 | Wagner | 280/33.1 |
| 2,075,926 | 4/1937 | Barr | 254/418 |
| 2,458,312 | 1/1949 | Stephen | 254/86 |
| 2,655,340 | 10/1953 | Dalton | 254/86 |
| 2,750,149 | 6/1956 | Mermelstein | 254/422 |
| 3,024,870 | 3/1962 | Kramcsak, Jr. et al. | 188/5 |
| 3,033,523 | 5/1962 | Mulholland et al. | 254/86 |
| 3,182,957 | 5/1965 | Dalton | 254/86 |
| 3,614,064 | 10/1971 | Bennett | 254/86 R |
| 3,765,668 | 10/1973 | Rohm | 269/208 |

Primary Examiner—Frederick R. Schmidt
Assistant Examiner—Judy J. Hartman

[57] ABSTRACT

A locking mechanism has a threaded housing mounted in one member of a jack/vehicle assembly. The housing has a locking pin which threadably moves through the housing and extends into a socket in the other member off center from the jack swivel point thus locking the jack in position and providing support for the trailer. The locking pin has a taper at its extension end which provides positive locking pin engagement with the socket and compensates for wear. Extension and retraction of the locking pin is performed by screwing the pin into or out of the housing. The locking pin is retained in the housing through the use of retaining pins thus obstructing disassembly of the locking mechanism and possible loss of the locking pin in the field.

22 Claims, 6 Drawing Figures

Fig. 4.
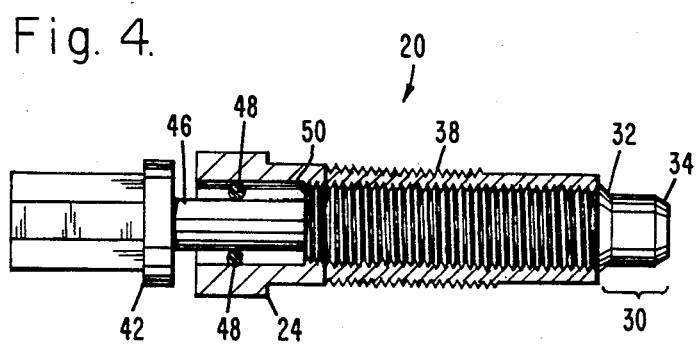
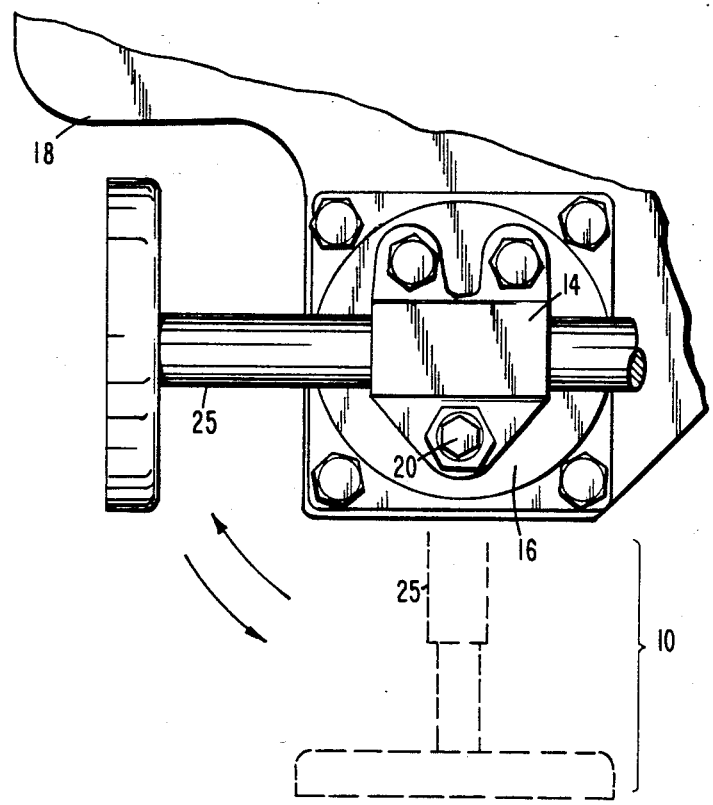
Fig. 1b.

JACK LOCKING MECHANISM

BACKGROUND OF THE INVENTION

The invention relates to trailer jacks and more particularly, to a trailer jack with a locking mechanism for the locking of the jack in position.

The invention, although having broad application to a wide variety of structures, is particularly suited to two or more wheeled trailers of the type which are often drawn by powered vehicles such as jeeps, and carry relatively complex and sensitive electronic equipment such as radar systems. These trailers many times require leveling and stabilization when the electronic equipment is in use. For this purpose, jacks are attached to various points on the trailer and are deployed when the electronic equipment is in use.

As a specific example, trailers carrying radar equipment including precision antennas and signal processing equipment, must in some cases be towed to positions in rugged terrain. While towing, it is desirable that all equipment of the trailer, such as jacks, be stowed and positively locked in position so as to not interfere with travel over the rugged terrain. When arriving at the selected position, the jacks must be capable of being rapidly deployed and of leveling the trailer in the rough terrain. In certain applications, it is also a requirement that the jacks be capable of maintaining the trailer in a stabilized position during operation of the electronic equipment.

To accomplish the above, the jack must be capable of being locked in position quickly and positively and once locked, the locking mechanism must be such that there is no looseness between the jack and the trailer so that operation of the electronic equipment does not cause trailer instability. In addition, some applications require that the jack and locking mechanism must be capable of being deployed and stowed numerous times and in many different environments including mud, snow, low and high temperatures, rain, etc., without degradation.

Prior techniques for jack locking mechanisms include spring loaded detent blades with detents in a bearing plate such as that shown in U.S. Pat. No. 3,033,523; locking pins with securing devices such as that shown in U.S. Pat. No. 2,885,181; and spring loaded pins which are permanently mounted on the jack structure and extend into sockets in the trailer frame. The above techniques are generally applicable to light duty trailers where a wide variety of environmental conditions is not encountered, and where absolute stability during jack deployment is not an absolute requirement. When exposed to extreme types of environmental conditions such as mud, ice, snow, etc., prior locking mechanisms would jam in some cases. In order to break the jammed locking mechanism free, extreme force would be applied in some cases and this would result in deformation of the locking mechanism. Also, due to the basic design of prior locking mechanism structures, close tolerances were not maintainable over numerous uses of the jack with the result of a loose jack even when locked in position. In some cases, in particular in the spring loaded techniques, safety problems have occurred. Due to prior applications of force to free the locking mechanism, deformation of parts resulted and the spring was not sufficiently strong enough to lock the jack in position in extremely rugged terrain.

SUMMARY OF THE INVENTION

It is a purpose of the invention to provide a jack locking mechanism which overcomes the above problems noted with prior techniques and is highly reliable and durable and provides positive locking of the jack in position.

It is also a purpose of the invention to provide a jack locking mechanism which can readily lock and unlock the associated jack.

It is also a purpose of the invention to provide a jack locking mechanism which is capable of operation without degradation in a wide variety of environmental conditions.

It is also a purpose of the invention to provide a jack locking mechanism which is capable of maintaining tight locking characteristics over numerous cycles of locking and unlocking.

It is also a purpose of the invention to provide a jack locking mechanism which is simple, easy to use, and which can be manufactured relatively easily and economically.

The foregoing enumerated purposes and other purposes are attained by the invention wherein there is provided a jack locking mechanism which is usable with many types of jacks including a swivelable type which swivels between a stowed position and a deployed position. The locking mechanism is basically used to lock a first structure in a selected relative position to a second structure, e.g., a jack locked in a deployed position for supporting an associated trailer. The locking mechanism includes an extendable/retractable pin mechanism located in one structure, e.g. the jack, and a socket for the engagement of the pin located in a second structure, e.g. the trailer.

In the locking mechanism, a threaded locking pin having two tapers at its extension section is screwably mounted inside a doubly threaded housing. The housing is screwably mounted in place by means of its outside threads and after mounting, provides a stationary support for the locking pin. The locking pin is moveable back and forth through the housing by threadably engaging the inside set of threads of the housing. In the extended position, the locking pin is screwed into the housing far enough so that the locking pin's extension section protrudes out from the housing and into the socket located in the trailer structure thereby locking the jack in relation to the trailer. To retract the pin from the socket and thus unlock the jack, the pin is unscrewed thus retracting it back into the housing.

The first taper at the extension section of the locking pin provides positive guidance of the pin into the socket in the second structure. By screwing the locking pin into the housing so that the extension section engages the socket, pressure is exerted against the socket by the second or locking taper. The locking taper of the locking pin provides a positive locking effect of the two structures since motion in any direction is restrained, and wear of the mating surfaces of the pin and socket are compensated for. Pressure is exerted against the socket by the taper by screwing the pin into the housing.

By the inclusion of retaining pins in the housing, inadvertent disassembly of the locking pin from the housing is obstructed. Once the locking pin has been inserted into the housing, the retaining pins are inserted so that the locking pin is moveable inside the housing for a particular length but it is not removeable from the housing without removing the retaining pins.

Other purposes, features and advantages of the invention will become apparent from a consideration of the accompanying drawings with the following detailed description.

BRIEF DESCRIPTION OF THE DRAWINGS

FIG. 1b is a side view of part of the trailer of FIG. 1a and the jack showing the stowed position of the jack, and the jack locking mechanism;

FIG. 4 is a partial sectional side view of a locking pin and housing assembly in accordance with the invention.

DETAILED DESCRIPTION OF THE INVENTION

Figure 1A:
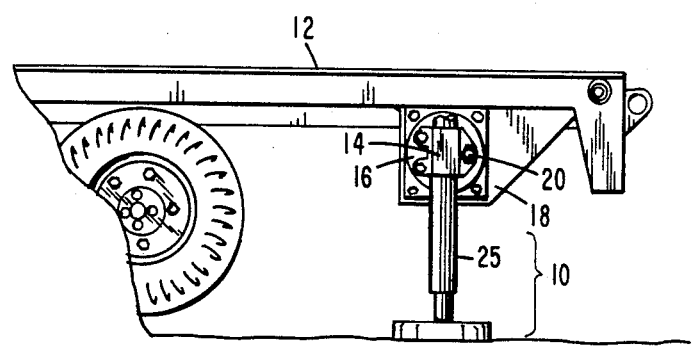
FIG. 1a is a side view of a trailer and one leveling/stabilizing jack showing the deployed position of the jack, and a jack locking mechanism in accordance with the invention.

Referring now to the drawings with more particularity wherein like reference numerals refer to like elements, FIGS. 1a and 1b present a jack locking mechanism in accordance with the invention. In FIG. 1a, a single swivelable leveling and stabilizing jack 10 is shown and is clamped in place relative to a wheeled trailer 12 by a clamp 14. The clamp 14 is mounted to a swivel plate 16 which is pivotally mounted to the trailer frame such as by a flange 18 or other like part of the trailer 12. Once the jack 10 is in its selected position, such as in the deployed position shown in FIG. 1a, a locking pin 20 is screwed into the clamp 14 far enough to extend it through the clamp 14 and into a socket located in the flange 18 in the trailer frame 12, thus locking the jack 10 in position relative to the trailer 12. Referring to FIG. 1b, the jack 10 is shown in the stowed position with arrows and dashed lines indicating the swivel motion for deployment and the deployed position. The clamp 14 is mounted upon a jack swivel plate 16 which rotates with the jack 10 as the jack is swiveled to its selected position.

Figure 3:
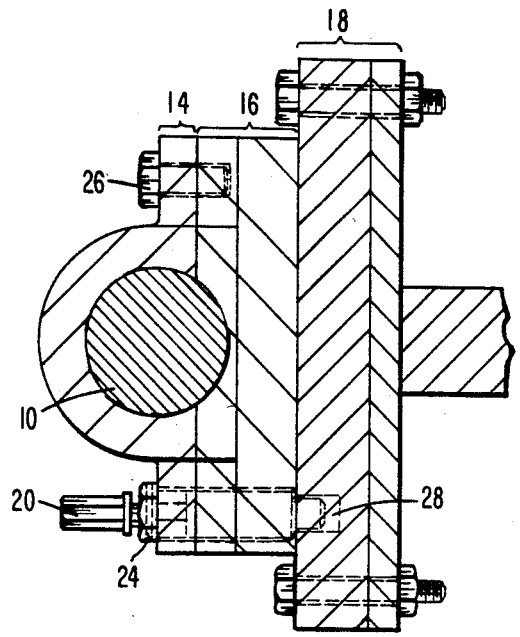
FIG. 3 is a partial cross sectional top view of the jack locking mechanism of FIG. 2.
Figure 2:
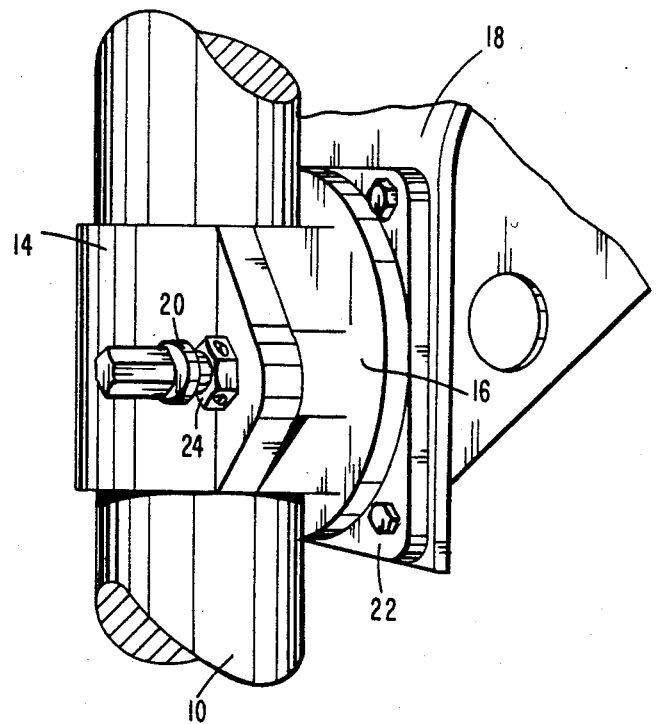
FIG. 2 is an enlarged perspective view of a jack locking mechanism in accordance with the invention.

In FIGS. 2 and 3, more detail is shown regarding a jack locking mechanism in accordance with the invention. In FIG. 2, the swivelable jack 10 is shown in the deployed position relative to the trailer 12, a part of which is shown. The square shaped plate 22 is bolted in place on the trailer 12 frame, and the swivel plate 16 is pivotally mounted to it. The jack 10 is held in position vertically by clamp 14. The locking pin 20 is screwably mounted into a housing, the head of which is shown as numeral 24, which is inserted through the clamp 14 and is itself screwably mounted in the swivel plate 16. As shown in FIG. 3, the clamp 14 is the outer curved member which partially surrounds the jack 10. The swivel plate 16 is contoured to engage part of the jack 10 and has a flat surface to engage the clamp 14. Thus, by use of the housing head 24, pressure is provided against the clamp 14 to clamp the jack 10 in position against the swivel plate 16.

If an extendable type of jack is used, the pressure applied by the housing head 24 against the clamp 14 will lock the nonextendable part 25 of the jack in position. As shown in FIG. 3, the jack 10 is shown clamped in position between the clamp 14 and the swivel plate 16. The bolt 26 holds the clamp 14 against the swivel plate 16 on one side of the jack 10 while the housing head 24 applies pressure against the clamp 14 on the other side of the jack 10. The locking pin 20 is shown extending through the swivel plate 16 and engaging a socket 28 in the flange 18 for locking the jack 10 in a selected position. The flange 18 is a part of the trailer 12.

More detail of the assembly of the locking pin 20 and housing is shown in FIG. 4. Both FIGS. 3 and 4 will be referred to in the following description. As is shown, the locking pin 20 has two tapers at its extension section 30, i.e. a locking taper 32 and a guiding taper 34. When the locking pin 20 is being extended, the guiding taper 34 aids in guiding the locking pin 24 into the socket 28. Due to the locking taper 32, a tight lock is obtained with the trailer 12 because the locking taper 32 engages the opening of the socket 28. Also there is compensation for wear of the opening of the socket 28. As material is worn through use, the locking taper 32 continues to provide a positive and firm mate with the socket 28 opening. Due to this locking taper 32, the jack can be positively locked in position by use of the locking pin 24. A large amount of force can be applied by the locking pin 24 to the trailer flange 18 due to the threaded engagement of the locking pin 24 with the housing 36 which is itself screwed into stationary position in the swivel plate 16. Undesirable movement is substantially reduced between the jack 10 and the trailer 12 once the locking pin 20 and the socket 28 are engaged since the use of the locking taper 32 with the socket 28 results in solid mating.

This locking mechanism has a further advantage in that the locking pin 20 provides support for the trailer 12 when the jack 10 is locked in the deployed position. Instead of having only the pin on which the jack swivels to support the trailer, the locking pin 20 also provides support. This double support results in more trailer stability.

Figure 5:
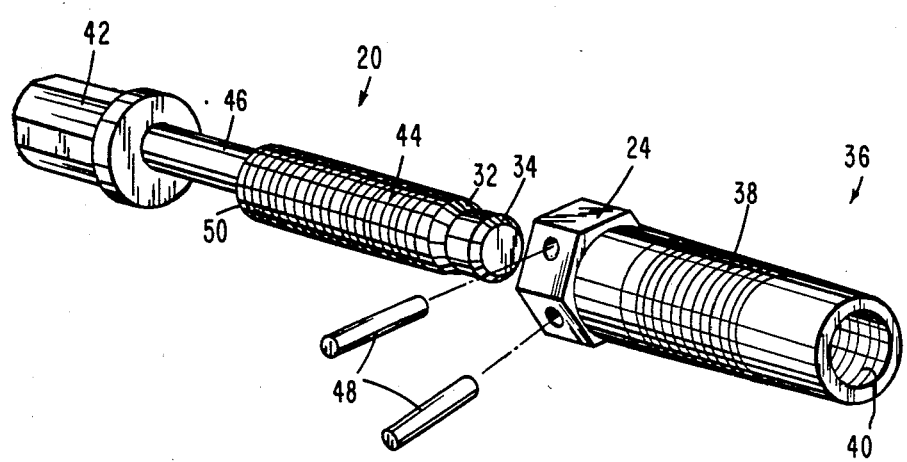
FIG. 5 is an exploded perspective view of the locking pin and housing assembly of FIG. 4.

FIG. 5 shows an exploded view of the locking pin of FIG. 4 and both FIGS. are referred to in the following discussion. The housing 36 has outside threads 38 for use in screwably mounting the housing 36 in the swivel plate 16. The inside threads 40 of the housing 36 are used for engaging the locking pin 20. The locking pin 20 includes a head 42 with flat surfaces thereon which are usable for applying a tool such as a socket wrench to effect the screwing motion required for extending or retracting the locking pin 20. The locking pin 20 also has a locking taper 32 at its extension section 30 for, as previously discussed, applying pressure against the opening of the socket 28. It has been found that the degree of the locking taper 32 and the size of the tapered surface affects the degree of stability that the jack 10 provides the trailer 12. A taper of substantially 30°, i.e., substantially including 30°, for the locking taper 32 and 45° for the guiding taper 34 have been found to be usable. Similarly, the amount of threaded areas of both the housing 36 and the locking pin 20 has an effect on the amount of force which can be exerted by the locking pin 20 against the socket 28. This is a consideration in the design of both the outside and inside threaded portions 38 and 40 respectively of the housing 36 and the threaded portion 44 of the locking pin 20.

As further shown in FIGS. 4 and 5, the locking pin 20 also has a reduced shaft size 46 between the head 42 and the threaded portion 44. This reduced shaft size 46 is usable in retaining the locking pin 20 in the housing 36 once they have been assembled. After the locking pin 20 has been screwed into the housing 36 to the appropriate extent, retaining pins 48 are inserted as shown.

Motion of the locking pin 20 is inhibited in the retraction direction by the retaining pins 48 which will engage the inside threaded shoulder 50 of the locking pin. Motion of the locking pin 20 is inhibited in the extension direction by contact of the locking pin head 42 with the head 24 of the housing. This motion restriction also determines the amount of extension available to the extension end 30 into the socket 28. The retaining pins 48 may be metal dowels driven into position into the housing 36.

Operationally, taking the example of when jack 10 is in the stowed position as shown in FIG. 1b, a wrench or like tool is applied to the head 42 of the locking pin 20 to retract it from engagement with the socket 28. The jack 10 is then swiveled downward to the deployed position such as that shown in FIG. 1a, and the locking pin 20 is screwed back into the housing 36 for engagement with the socket 28 (shown in FIG. 3). The guiding taper 34 aids in the locking pin 20 locating the socket 28 when being screwed into extension. The locking pin 20 is extended into the socket 38 until appropriate pressure is applied by the locking pin to effect the required locking of the jack 10 in position. Because the locking pin 20 is retained in the housing 36 by the retaining pins 48, it cannot be inadvertantly unscrewed from the housing 36 and lost. Furthermore, since the locking pin 20 has a threaded engagement for extension and retraction, mud, ice, dirt and other debris will have only a minor impact on use since great pressure can be applied to turn the locking pin 50 thus breaking away any debris that may tend to inhibit movement. For this reason, it has been found that an environmental seal is not necessary although a dry film lubricant is useful on the locking pin threads 44.

Although the invention has been described in detail, it is anticipated that modifications and variations may occur to those skilled in the art which do not depart from the inventive concepts. For example, although retaining pins 48 have been shown in the embodiment disclosed herein, those skilled in the art will recognize that other arrangements may be employed for retaining the locking pin 20 within the housing 36. Also, although the jack 10 is shown as a swivelable type of jack being clamped in position by a particular type of clamp, i.e., clamp 14, it will be recognized by those skilled in the art that other jacks and methods for clamping the jack 10 in position are usable. Furthermore, although an arrangement has been shown where the housing with pin are located on the jack and the socket in the vehicle, an opposite arrangement, i.e. where the housing with the pin are located on the vehicle and the socket in the jack, is also usable. Accordingly, it is intended that the invention be limited only by the scope of the claims, not by the description, and so the invention will include such modifications and variations unless the claims limit the invention otherwise.

What is claimed is:

1. A jack locking apparatus for locking in position a jack which is mounted on a vehicle, for movement into and out of engagement with a supporting surface, comprising:

a first member having at least one socket formed therein;

a second member including a housing having threads on its inside surface, the housing being fixedly coupled with the second member and the housing including a locking pin, the locking pin having a head, an extensible section and a threaded portion disposed between the head and the extensible section, the extensible section having an annular tapered surface for engaging and applying pressure to the at least one socket, the locking pin being threadably engaged with the threads on the inside surface of the housing so that applying a turning force to the head will cause the extensible section to screwably extend from the housing to engage the at least one socket to lock the jack into position or retract into the housing to disengage from the at least one socket to unlock the jack for movement thereof, as selected; and the first and second members being mounted so that one of the members is fixedly mounted relative to the jack, and the other member is fixedly mounted relative to the vehicle.

2. The jack locking apparatus of claim 1 wherein the annular tapered surface has a taper of substantially thirty degrees.

3. The jack locking apparatus of claim 1 further comprising retaining means for restraining the disassembly of the locking pin from the housing.

4. The jack locking apparatus of claim 3 wherein:

the locking pin further comprises a retaining portion disposed between the head and the threaded portion, which has a reduced diameter from the threaded portion; and the retaining means comprises at least one retaining pin inserted through the housing at a predetermined location for engaging the retaining portion of the locking pin;

whereby the amount of retraction of the locking pin into the housing is limited.

5. The jack locking apparatus of claim 4 wherein the at least one retaining pin comprises two retaining pins inserted through the housing on opposite sides of the retaining portion of the locking pin.

6. A jack locking apparatus for locking in position a jack which is mounted on a vehicle, for movement into and out of engagement with a supporting surface, comprising:

a first member having at least one socket formed therein;

a second member including a housing having threads on its inside surface, the housing being fixedly coupled with the second member and the housing including a locking pin, the locking pin having a head, an extensible section and a threaded portion disposed between the head and the extensible section, the locking pin being threadably engaged with the threads on the inside surface of the housing so that applying a turning force to the head will cause the extensible section to screwably extend from the housing to engage one of the at least one socket to lock the jack into position or retract into the housing to disengage from the at least one socket to unlock the jack for movement thereof, as selected, the extensible section having an end on which is formed a first annular tapered surface for guiding the pin into the at least one socket and a second annular tapered surface for engaging and applying pressure to the at least one socket; and the first and second members being mounted so that one of the members is fixedly mounted relative to the jack, and the other member is fixedly mounted relative to the vehicle.

7. The jack locking apparatus of claim 6 wherein the second annular tapered surface has a taper of about thirty degrees.

8. A jack locking apparatus for locking in position a jack which is mounted on a vehicle, for movement into and out of engagement with a supporting surface, comprising:
a first member having at least one socket formed therein;
a second member including a housing having threads on its inside surface;
the housing having an outside surface on which threads are formed and the housing being threadably coupled to the second member by the threads, and the housing including a locking pin, the locking pin having a head, an extensible section and a threaded portion disposed between the head and the extensible section, the locking pin being threadably engaged with the threads on the inside surface of the housing so that applying a turning force to the head will cause the extensible section to screwably extend from the housing to engage the at least one socket to lock the jack into position or retract into the housing to disengage from the at least one socket to unlock the jack for movement thereof, as selected; and
the first and second members being mounted so that one of the members is fixedly mounted relative to the jack, and the other member is fixedly mounted relative to the vehicle.

9. A jack locking apparatus for locking in position a jack which is mounted on a vehicle, for movement into and out of engagement with a supporting surface, comprising:
a housing coupled to the jack so that the housing moves with the jack;
a member, fixedly coupled to the vehicle, having at least one socket formed therein;
a locking pin for engaging the at least one socket, comprising:
a head;
an extensible section for engaging the socket, the extensible section having an annular tapered surface for engaging and applying pressure to the socket opening;
a threaded portion disposed between the head and the extensible section; and
the locking pin being threadably engaged with the threads on the inside surface of the housing so that applying a turning force to the head will cause the extensible section to screwably extend from the housing to engage the at least one socket or retract into the housing to disengage from the at least one socket, as selected.

10. The jack locking apparatus of claim 9 wherein the annular tapered surface has a taper of substantially thirty degrees.

11. The jack locking apparatus of claim 9 wherein the extensible section further comprises an end on which is formed a second annular tapered surface for guiding the extensible section into the at least one socket.

12. The jack locking apparatus of claim 9 further comprising retaining means for restraining the disassembly of the locking pin from the housing.

13. The jack locking apparatus of claim 12 wherein the locking pin further comprises a retaining portion disposed between the head and the threaded portion, which has a reduced diameter from the threaded portion.

14. The jack locking apparatus of claim 13 wherein the retaining means comprises at least one retaining pin inserted through the housing at a predetermined location for engaging the retaining portion of the locking pin and limiting the amount of locking pin retraction into the housing thereby.

15. A swivelable jack apparatus for attaching to a vehicle, comprising:
an extensible jack for engaging a supporting surface;
clamp means for pivotally securing the jack in a selected position on the vehicle;
a locking apparatus for locking the jack in a selected position of swivel comprising:
a housing threadably coupled to the clamp means, the housing having threads on its inside surface;
a member, fixedly coupled to the vehicle, having at least one socket formed therein; and
a locking pin having a head, an extensible section for engaging the socket, and a threaded portion disposed between the head and the extensible section for threadably engaging the threads on the inside surface of the housing for extending the extensible section into engagement with the at least one socket or retracting the extensible section into the housing disengaging from the at least one socket, as selected, by the application of a turning force to the locking pin head.

16. The swivelable jack apparatus of claim 15 wherein the extensible end has an annular tapered surface for engaging and applying pressure to the at least one socket.

17. The swivelable jack apparatus of claim 16 wherein the annular tapered surface has a taper of substantially thirty degrees.

18. The swivelable jack apparatus of claim 15 wherein the extensible section has an end on which is formed a first annular tapered surface for guiding the pin into the at least one socket and a second annular tapered surface for engaging and applying pressure to the at least one socket.

19. The swivelable jack apparatus of claim 18 wherein the second annular tapered surface has a taper of substantially thirty degrees.

20. The swivelable jack apparatus of claim 15 further comprising retaining means for restraining the disassembly of the locking pin from the housing.

21. The swivelable jack apparatus of claim 20 wherein the retaining means comprises:
a retaining portion formed in the locking pin and disposed between the head and the threaded portion, having a reduced diameter from the threaded portion; and
at least one retaining pin inserted through the housing at a predetermined location for engaging the retaining portion of the locking pin and limiting the amount of locking pin retraction into the housing by contacting the threaded portion upon a selected amount of locking pin retraction.

22. The swivelable jack apparatus of claim 15 wherein:
said housing further comprises a housing head which engages the clamp means and applies pressure to the clamp means;
whereby the housing head functions to apply clamping pressure to the jack.

* * * * *